No. 874,028.  
PATENTED DEC. 17, 1907.
T. J. NEWCOME.  
COAL MINING MACHINE.  
APPLICATION FILED DEC. 15, 1906.
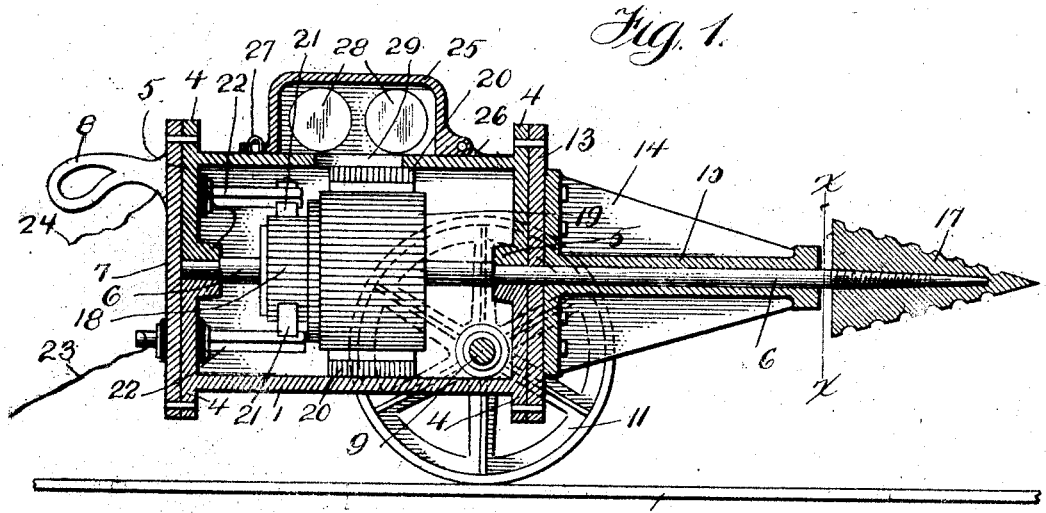
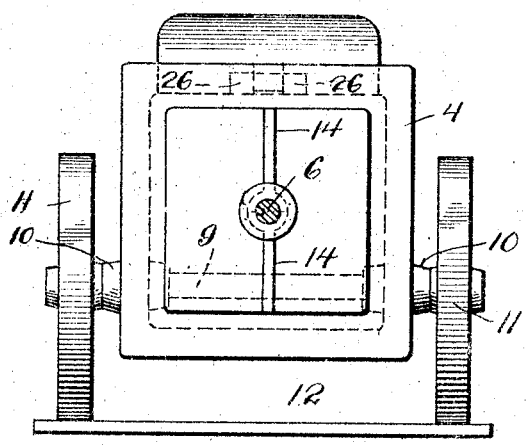
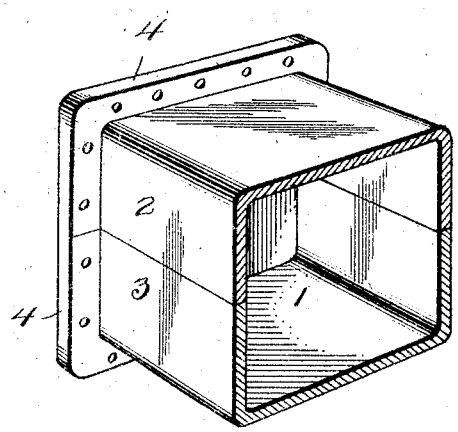
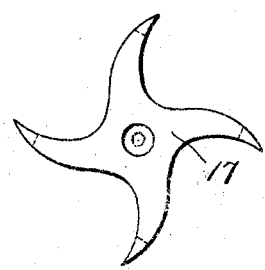
WITNESSES:  
Samuel Payne  
D. H. Butler
INVENTOR  
Thomas J. Newcome.  
BY H. C. Evert & Co.  
Attorneys

UNITED STATES PATENT OFFICE.

THOMAS J. NEWCOME, OF JAMISONVILLE, PENNSYLVANIA, ASSIGNOR OF ONE-HALF TO JOHN C. HIRST, OF REYNOLDSVILLE, PENNSYLVANIA.

COAL-MINING MACHINE.

No. 874,028.   Specification of Letters Patent.   Patented Dec. 17, 1907.

Application filed December 15, 1906. Serial No. 348,050.

*To all whom it may concern:*

Be it known that I, THOMAS J. NEWCOME, a citizen of the United States of America, residing at Jamisonville, in the county of Butler and State of Pennsylvania, have invented certain new and useful Improvements in Coal-Mining Machines, of which the following is a specification, reference being had therein to the accompanying drawing.

This invention relates to electric coal mining machines, and its object is to provide a machine having an electrically-driven shaft carrying a drill bit.

The invention consists of a casing containing an electric motor and provided with suitable shaft bearings, said casing being mounted upon wheels to adapt the machine to be easily moved upon a track to advance or retract it with relation to the surface to be drilled.

The invention also consists of certain novel details of construction all of which will be fully described hereinafter in connection with the accompanying drawing, which forms a part of this specification and defined in the appended claims.

In the drawing, Figure 1 is a longitudinal vertical section of a mining machine embodying the invention, Fig. 2 is a transverse vertical section on the line $x$—$x$ of Fig. 1, Fig. 3 is a view in perspective partly in vertical transverse section of the machine casing, and Fig. 4 is an end elevation of the drill-bit.

The reference numeral 1 designates a rectangular metallic casing preferably cast in two sections 2 and 3 each having integral closure plates 4, which when brought together provide heads to close the ends of the casing. Each of the closure plates 4 is formed with a half bearing 5 on its inner side and when said half bearings are brought together they provide bearings for a motor shaft 6.

To the rear end of the casing 1 is securely bolted a rectangular plate 7 from which project handles 8 to facilitate moving the machine. A transverse shaft 9 extends through the casing being supported in bearings 10 formed in the sides of the casing and upon the ends of said shaft are mounted wheels 11 adapted to travel on a suitable support 12. To the front end of the casing is secured a rectangular plate 13 by suitable bolts, and from said plate projects a bracket 14 having a tubular extension 15 registering with the bearing in the front closure plate and a bearing formed in the plate 13, and serving as a bearing for the front end of the shaft 6, and having a drill-bit 17 removably attached to its forward end. Within the casing 1 is suitably supported a motor of any well-known construction provided with the usual commutator 18, armature 19 and field magnets 20. The contact brushes 21 bearing upon the commutator are supported upon arms 22 connected by conductors 23 and 24 to the opposite poles of a source of current supply. Upon the top of the casing is a hood 25 hinged at one side between lugs 26 projecting from the top of the casing, and adapted to be detachably secured at its opposite side by a staple 27 or other suitable securing device. Within this hood is supported any preferred form of rheostat as conventionally represented at 28, an opening 29 being formed in the top of the casing for the passage of the required connections between the rheostat and motor windings.

It will be apparent that the hood 25 may be readily thrown back upon its hinged support to permit access to the rheostat. The brush-carrying arms 22 are suitably insulated from the casing as indicated at the points 30. The drill-bit 17 may be of any preferred form, but is preferably of the conical or tapering form shown with radially disposed cutters.

The utility and operation of the improvement will be readily understood. The revolution of the armature shaft revolving the drill-bit 17, and the machine may be readily moved upon its wheel supports by means of the handles 8. The bit may be readily disconnected and removed for sharpening or repairs, and the construction of the machine casing permits of its being opened for the renewal of the mechanism contained therein. As will be seen all of the operating parts of the machine with the exception of the drill, are inclosed and therefore free from liability of flying particles of coal, dust, etc. Furthermore, the shaft 6 is not only held against longitudinal movement, but the extended bearing prevents liability of the shaft being sprung or buckled under the pressure placed thereon during the drilling operation. The particular structure shown provides a compact motor-carrier, rigid and durable in structure, and which can be readily manipulated.

What I claim and desire to secure by Letters Patent, is:—

1. In a coal mining machine, a closed motor-carrying casing formed in sections, a reinforcing plate secured on each end of the casing, an extended bearing secured to the front reinforcing plate, a motor shaft mounted in the ends of said sections, said shaft extending longitudinally of the casing and through said extended bearing, said shaft being held from longitudinal movement, a motor for imparting rotary movement to the shaft, a pair of wheels on said casing adjacent the front end thereof, and a drill mounted on the end of the motor shaft.

2. In a coal mining machine, comprising a motor-carrying casing formed in sections, each section comprising an intermediate portion U-shaped in cross-section, and ends formed integral therewith, said sections opposing each other to form a closed casing, the ends projecting outwardly beyond the plane of the intermediate portion to provide securing flanges, a reinforcing plate for each end, said plates abutting against the outer faces of the ends and secured to the projecting portions of the ends, an extended bearing secured to the front reinforcing plate, a motor shaft mounted in the ends of said sections, said shaft extending longitudinally of the casing and through said extended bearing, said shaft being held from longitudinal movement, a motor for imparting rotary movement to the shaft, a pair of wheels on said casing adjacent the front end thereof, and a drill mounted on the end of the motor shaft.

3. In a coal mining machine, a closed motor-carrying casing formed in sections, a reinforcing plate secured on each end of the casing, an extended bearing secured to the front reinforcing plate, said bearing having strengthening ribs extending longitudinally of the bearing, a motor shaft mounted in the ends of said sections, said shaft extending longitudinally of the casing and through said extended bearing, said shaft being held from longitudinal movement, a motor for imparting rotary movement to the shaft, a pair of wheels on said casing adjacent the front end thereof, and a drill mounted on the end of the motor shaft.

4. In a coal mining machine, comprising a motor-carrying casing formed in sections, each section comprising an intermediate portion U-shaped in cross section, and ends formed integral therewith, said sections opposing each other to form a closed casing, the ends projecting outwardly beyond the plane of the intermediate portion to provide securing flanges, an opening formed in the top of the casing, a hinged cover for said casing, said cover forming a compartment above said opening, a reinforcing plate for each end, said plates abutting against the outer faces of the ends and secured to the front reinforcing plate, a motor shaft mounted in the ends of said sections, said shaft extending longitudinally of the casing and through said extended bearing, said shaft being held from longitudinal movement, a motor for imparting rotary movement to the shaft, a pair of wheels on said casing adjacent the front end thereof, and a drill mounted on the end of the motor shaft.

In testimony whereof I affix my signature in the presence of two witnesses.

THOMAS J. NEWCOME.

Witnesses:
  GEORGE T. MILLER,
  JOHN H. WILSON.